United States Patent
Carames et al.

(10) Patent No.: US 9,191,499 B2
(45) Date of Patent: Nov. 17, 2015

(54) DOMAIN INDICATOR TONE FOR A CALLING PARTY

(71) Applicant: Cellco Partnership, Basking Ridge, NJ (US)

(72) Inventors: Miguel A. Carames, Martinez, CA (US); Amol Tuli, Dublin, CA (US); Jignesh Patel, Haltom City, TX (US)

(73) Assignee: Cellco Partnership, Basking Ridge, NJ (US)

( * ) Notice: Subject to any disclaimer, the term of this patent is extended or adjusted under 35 U.S.C. 154(b) by 44 days.

(21) Appl. No.: 14/031,802

(22) Filed: Sep. 19, 2013

(65) Prior Publication Data

US 2015/0079950 A1    Mar. 19, 2015

(51) Int. Cl.
*H04M 3/42* (2006.01)

(52) U.S. Cl.
CPC .................... *H04M 3/42017* (2013.01)

(58) Field of Classification Search
CPC ... H04M 3/42017; H04M 3/436; H04M 3/02; H04M 3/54; H04M 19/04; H04M 2203/2011; H04M 3/42093; H04M 3/4211; H04M 3/42374

See application file for complete search history.

(56) References Cited

U.S. PATENT DOCUMENTS

| | | | |
|---|---|---|---|
| 8,406,252 B1* | 3/2013 | Wuthnow et al. | 370/466 |
| 8,467,517 B2* | 6/2013 | Murthy et al. | 379/257 |
| 2007/0286372 A1* | 12/2007 | DeMent et al. | 379/142.01 |
| 2008/0120176 A1* | 5/2008 | Batni et al. | 705/14 |
| 2010/0220843 A1* | 9/2010 | Bosan et al. | 379/88.22 |
| 2010/0227631 A1* | 9/2010 | Bolton et al. | 455/466 |
| 2013/0223607 A1* | 8/2013 | Hillier | 379/215.01 |

* cited by examiner

*Primary Examiner* — Liton Miah (57) ABSTRACT

A device may receive information identifying a call attempt associated with a calling device. The device may select a domain network, of a plurality of domain networks, for the call attempt. Each of the plurality of domain networks may be associated with a respective domain type. The device may identify the respective domain type associated with selected domain network. The device may cause a tone, associated with the respective domain type, to be output by the calling device to notify a user of the calling device that the call attempt is being made via the selected domain network.

19 Claims, 10 Drawing Sheets

DOMAIN INDICATOR TONE FOR A CALLING PARTY

BACKGROUND

A ringback tone is an audible indication played by a calling device, associated with a calling party, while a called device, associated with a called party, is being contacted. The ringback tone may be a repeated tone designed to assure the calling party that the called party's device is ringing. The ringback tone may also include another type of tone, such as a song (e.g., ringback music), an advertisement (e.g., a ringback advertisement), or the like.

DETAILED DESCRIPTION OF PREFERRED EMBODIMENTS

The following detailed description of example implementations refers to the accompanying drawings. The same reference numbers in different drawings may identify the same or similar elements.

A calling device, associated with a calling party, may attempt to communicate with a called device, associated with a called party (e.g., a voice call, a video call, etc.). A network, associated with the calling device and/or the called device, may attempt to connect the call via a first domain network (e.g., an internet protocol multimedia subsystem ("IMS") domain network, a code division multiple access ("CDMA") domain network, a global system for mobile communications ("GSM") domain network, etc.). However, the called device may not be reachable via the first domain network. As such, the network may attempt to connect the call via a second domain network, and may continue attempting to connect the call via one or more other domain networks (e.g., where the called device is not reachable via the second domain network, etc.). The calling party may experience an extended connection time (e.g., a time associated with attempting to connect the call) as a result of the network attempting the call via multiple domain networks. Implementations described herein may allow a tone, associated with a domain network, to be played by a calling device when a call is attempted using the domain network. In this way, a calling party, associated with the calling device, may be notified when the call is attempted via the domain network (e.g., the calling party may be made aware that the call is being attempted, despite the extended connection time).

Figure 1A:
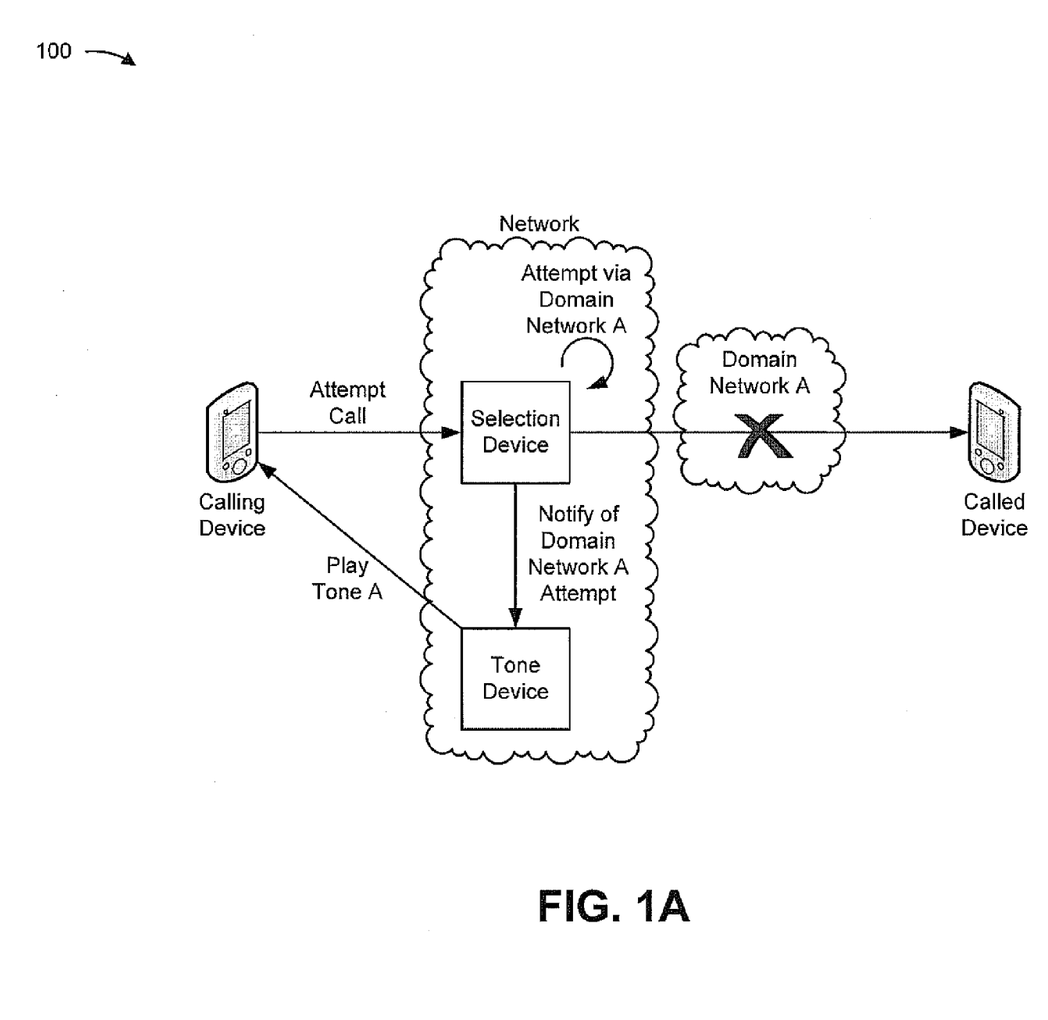
FIGS. 1A and 1B are diagrams of an overview of an example implementation described herein.
Figure 1B:
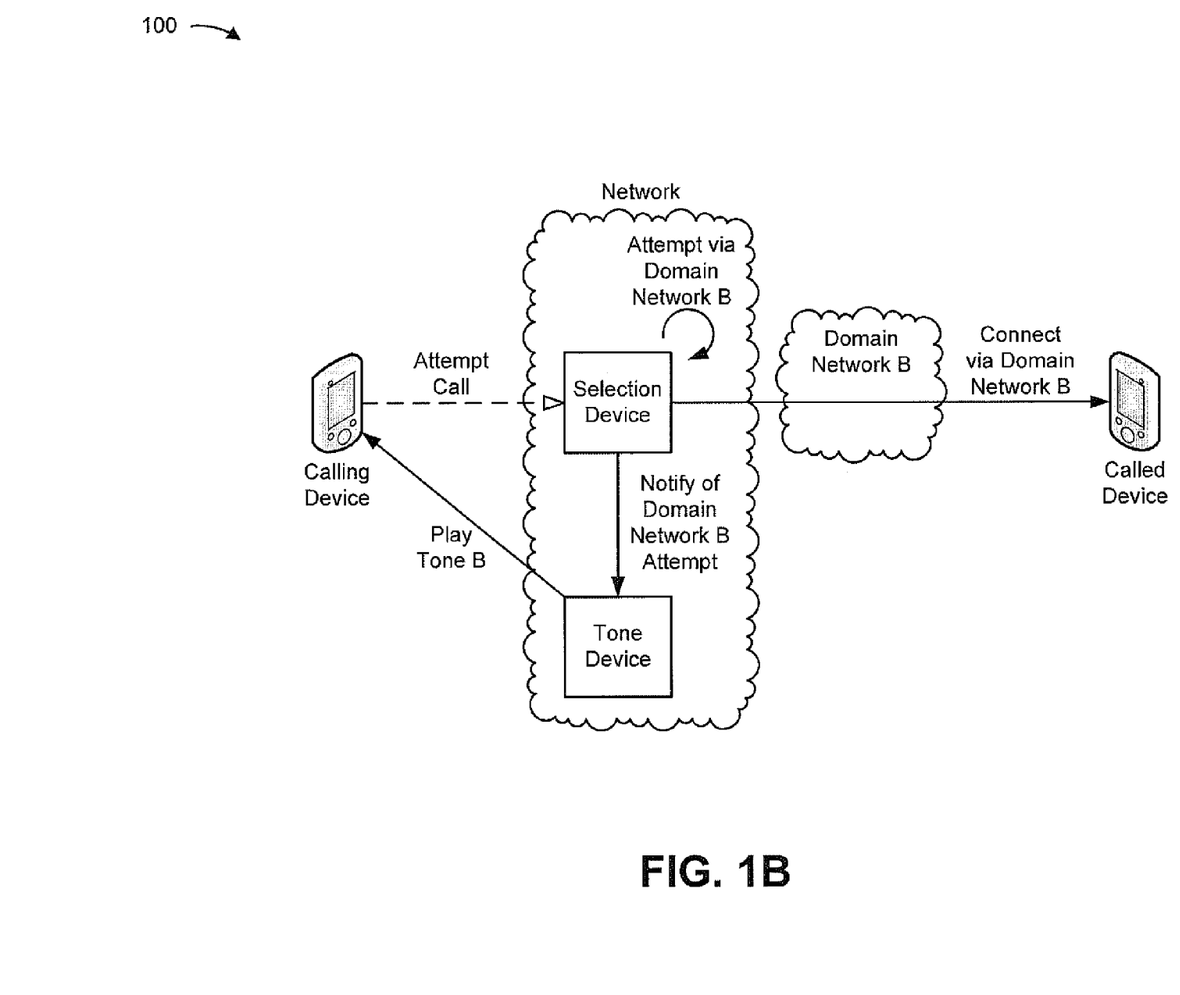

FIGS. 1A and 1B are diagrams of an overview of an example implementation 100 described herein. For the purposes of FIGS. 1A and 1B, assume that a calling device, associated with a calling party, is attempting to call a called device using a network. Further, assume that a selection device, associated with the network, stores information associated with one or more domain networks to be used to attempt the call. Finally, assume that a tone device, associated with the selection device and the network, stores information identifying one or more tones associated with the one or more domain networks.

As shown in FIG. 1A, the calling device may attempt to call the called device using the network and, the selection device may receive information indicating that the call is to be attempted. As shown, the selection device may determine that the call is to be attempted via domain network A. As further shown, the selection device may send, to the tone device, a notification indicating that the call is being attempted via domain network A. As shown, the tone device may receive the notification, and may determine, based on information stored by the tone device, that tone A is to be played by the calling device (e.g., where tone A is associated with domain network A). As shown, the tone device may cause the calling device to play tone A. Finally, the selection device may determine that the called device cannot be reached via domain network A.

As shown in FIG. 1B, the selection device may determine that the call is to be attempted via domain network B (e.g., since the called device was not reachable via domain network A). As further shown, the selection device may send, to the tone device, a notification indicating that the call is being attempted via domain network B. As shown, the tone device may receive the notification, and may determine, based on information stored by the tone device, that tone B is to be played by the calling device (e.g., where tone B is associated with domain network B). As shown, the tone device may cause the calling device to play tone B. Finally, the selection device may determine that the called device can be reached via domain network B, and the call may be connected via domain network B. In this way, the calling device may play a tone, associated with a domain network, when a call is attempted via the domain network. This may allow the calling party to be made aware when the call attempt is made via the domain network.

Figure 2:
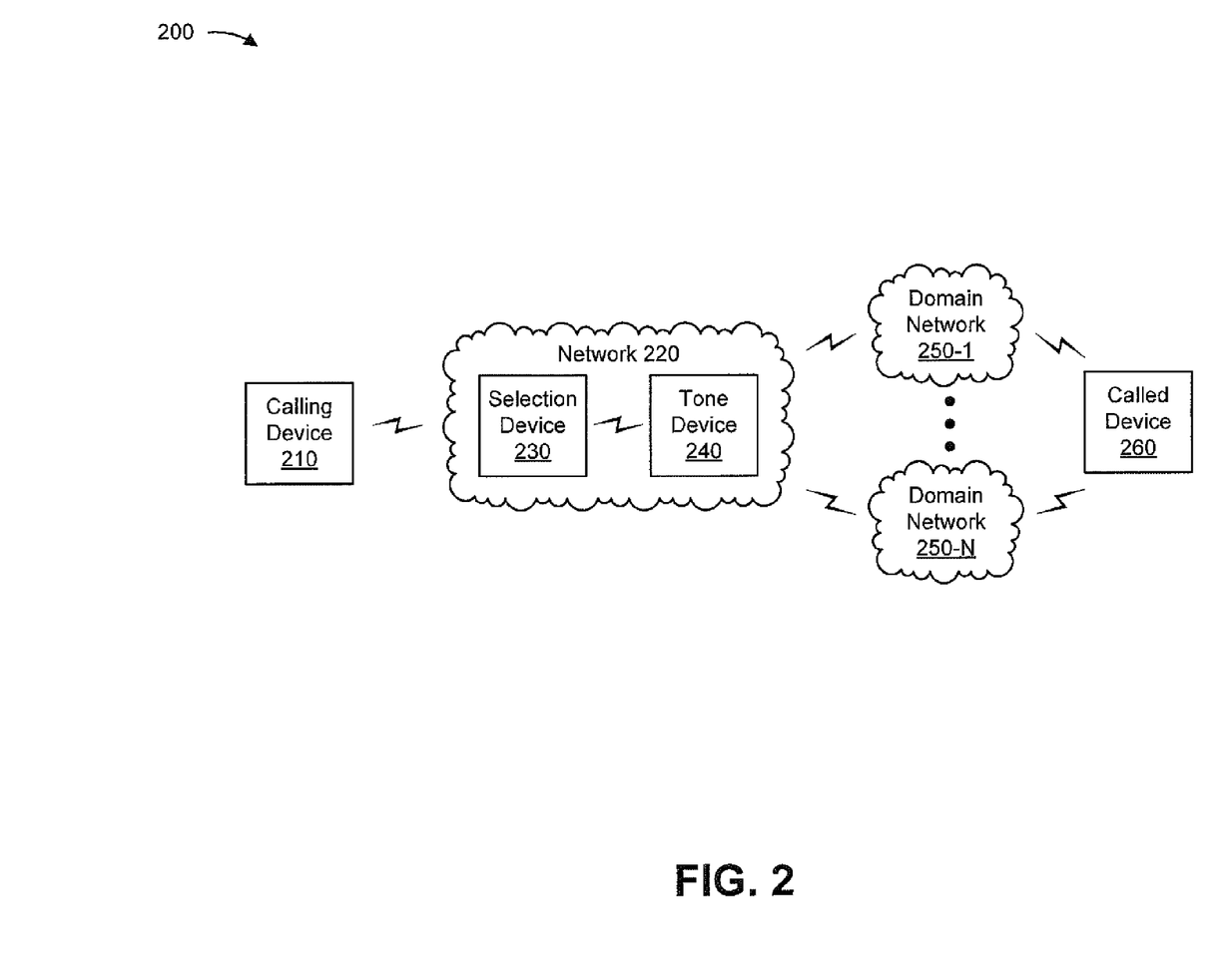
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a calling device 210, a network 220, a selection device 230, a tone device 240, a set of domain networks 250-1 through 250-N (N>1) (hereinafter collectively referred to as "domain networks 250," and individually as "domain network 250"), and a called device 260.

Calling device 210 may include one or more devices capable of communicating with another device via network 220. For example, calling device 210 may include a wired communication device, a wireless communication device, a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a desktop computer, a laptop computer, a tablet computer, and/or a similar device. In some implementations, calling device 210 may include a device capable of communicating with called device 260 (e.g., on a voice call, on a video call, etc.) via network 220 and/or domain network 250.

Network 220 may include one or more wired and/or wireless networks. For example, network 220 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. In some implementations, network 220 may allow calling device 210 to communicate with another device (e.g., selection device 230, tone device 240, called device 260, etc.). In some implementations, network 220 may include selection device 230, tone device 240, and/or one or more domain networks 250.

Selection device 230 may include one or more devices capable of receiving, determining, generating, processing, storing, and/or providing information associated with a domain network (e.g., an IMS domain network, a CDMA domain network, a GSM domain network, a WiFi network, etc.) that may be used to attempt a call (e.g., between calling device 210 and called device 260). For example, selection device 230 may include a server or a collection of servers (e.g., a service centralization and continuity application server, a voice call continuity application server, a terminating access domain selection application server, a call delivery application server, etc.). In some implementations, selection device 230 may receive, from calling device 210 and/or another device associated with network 220, information associated with a call attempt, and selection device 230 may determine (e.g., based on information stored by selection device 230) a domain network 250 to be used to attempt the call. In some implementations, selection device 230 may include a device capable of sending and/or receiving information, associated with domain network 250, to and/or from one or more devices associated with network 220 (e.g., tone device 240, etc.). In some implementations, selection device 230 may receive information indicating that called device 260 is not reachable via a first domain network, and selection device 230 may determine a second domain network that is to be used to attempt the call. In some implementations, selection device 230 may be included in network 220. In some implementations, selection device 230 and tone device 240 may be combined into a single device.

Tone device 240 may include one or more devices capable of receiving, generating, processing, storing, and/or providing information identifying a tone, associated with domain network 250, that is to be played by calling device 210. For example, tone device 240 may include a server or a collection of servers (e.g., a media resource function server, a ringback tone server, a personal ringback tone server, etc.). In some implementations, tone device 240 may receive, from selection device 230 and/or another device associated with network 220, information identifying domain network 250, associated with a call attempt, and tone device 240 may determine (e.g., based on information stored by tone device 240) a tone that is to be played by calling device 210. In some implementations, tone device 240 may include a device capable of sending and/or receiving information, associated with the tone, to and/or from one or more devices associated with network 220 (e.g., calling device 210, selection device 230, etc.). In some implementations, tone device 240 may be included in network 220.

Domain network 250 may include a group of devices, one or more wired, and/or one or more wireless networks associated with a communication technology and/or a communication standard. For example, domain network 250 may include a cellular network, a PLMN, a LAN, a WAN, a MAN, a telephone network, an ad hoc network, an intranet, the Internet, a fiber optic-based network, and/or a combination of these or other types of networks. In some implementations, domain network may be associated with a particular communication technology and/or communication standard (e.g., IMS, CDMA, GSM, WiFi, etc.). In some implementations, domain network 250 may allow called device 260 to communicate with another device (e.g., calling device 210, etc.). In some implementations, called device 260 may be capable of communicating with calling device 210 and/or network 220 via one or more domain networks 250. In some implementations, domain network 250 (e.g., and the devices included within domain network 250) may be included as part of network 220.

Called device 260 may include one or more devices capable of communicating with another device via network 220. For example, called device 260 may include a wired communication device, a wireless communication device, a radiotelephone, a PCS terminal, a PDA, a smart phone, a desktop computer, a laptop computer, a tablet computer, and/or a similar device. In some implementations, called device 260 may include a device capable of communicating with calling device 210 (e.g., on a voice call, on a video call, etc.) via network 220 and/or domain network 250.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
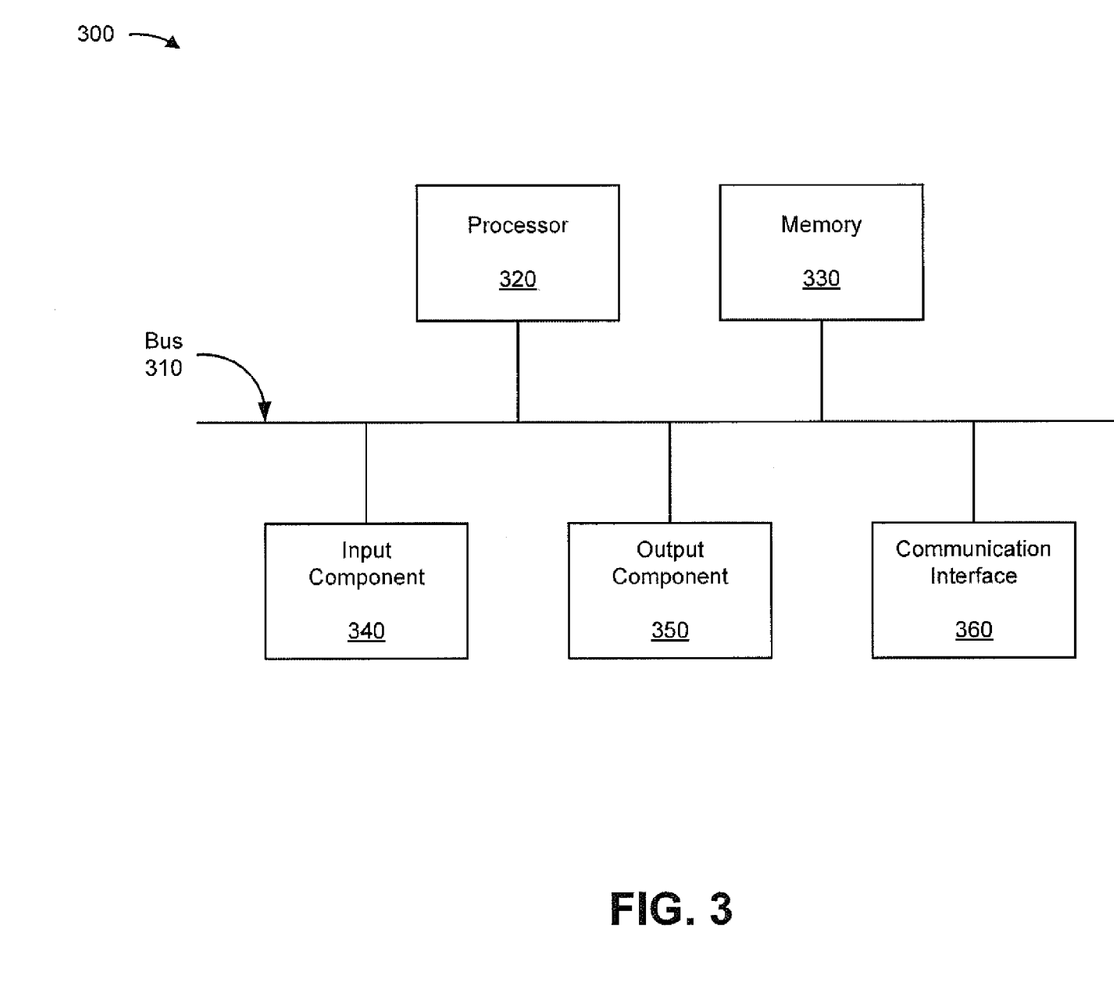
FIG. 3 is a diagram of example components of one or more devices of FIG. 2.

FIG. 3 is a diagram of example components of a device 300. Device 300 may correspond to calling device 210, selection device 230, tone device 240, and/or called device 260. Additionally, or alternatively, each of calling device 210, selection device 230, tone device 240, and/or called device 260 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
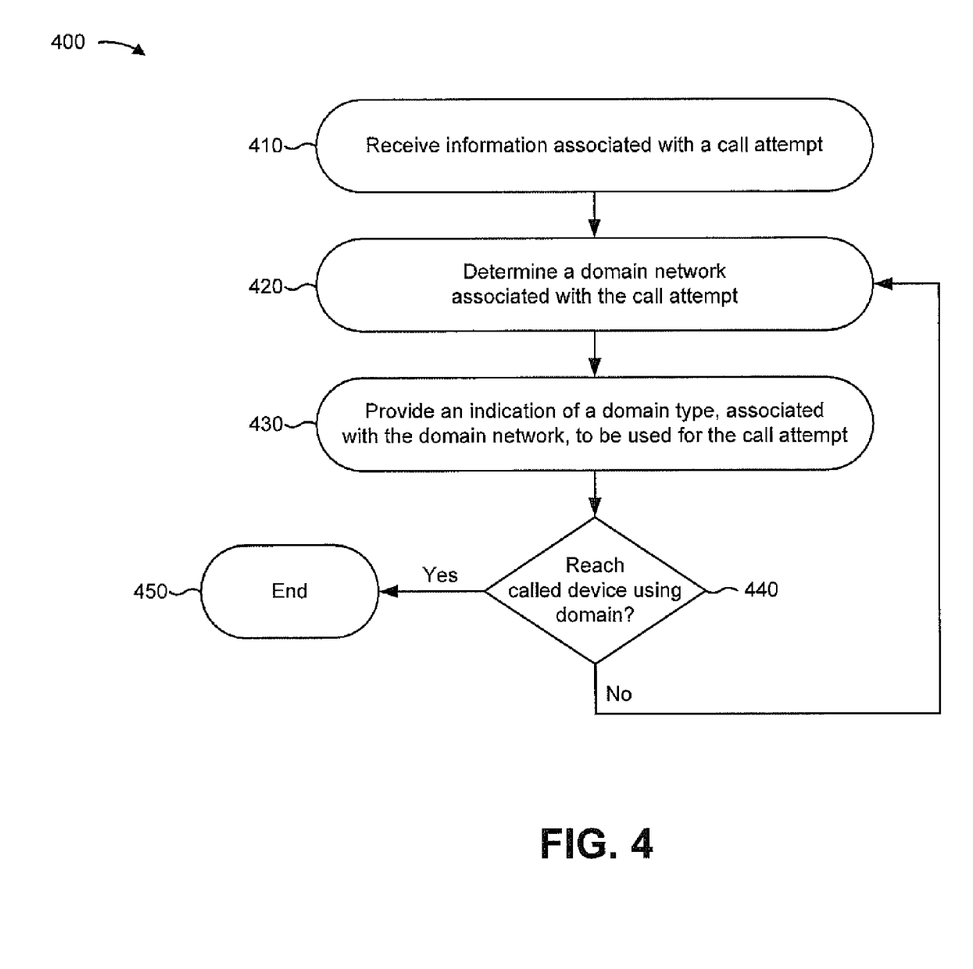
FIG. 4 is a flow chart of an example process for selecting a domain network to be used to attempt a call, and providing an indication of a domain type associated with the domain network.

FIG. 4 is a flow chart of an example process 400 for selecting a domain network to be used to attempt a call, and providing an indication of a domain type associated with the domain network. In some implementations, one or more process blocks of FIG. 4 may be performed by selection device 230. In some implementations, one or more process blocks of FIG. 4 may be performed by another device or a group of devices separate from or including selection device 230, such as tone device 240.

As shown in FIG. 4, process 400 may include receiving information associated with a call attempt (block 410). For example, selection device 230 may receive information indicating that a call attempt, associated with calling device 210 and called device 260, is to be made via network 220 and/or domain network 250. In some implementations, selection device 230 may receive the information when calling device 210 sends (e.g., via network 220) information indicating that the call is to be attempted. In some implementations, selection device 230 may receive the information from calling device 210. Additionally, or alternatively, selection device 230 may receive the information from another device associated with network 220 (e.g., a device associated with attempting the call between calling device 210 and called device 260).

In some implementations, the information associated with the call attempt may include a calling device identifier and/or called device identifier (e.g., a string of characters, an international mobile subscriber identity ("IMSI"), a mobile subscriber integrated services digital network number ("MSISDN"), a mobile directory number ("MDN"), etc.) that identifies calling device 210 or called device 260 associated with the call attempt. Additionally, or alternatively, the information may include information identifying one or more domain networks 250 and/or one or more domain types (e.g., IMS, CDMA, GSM, WiFi, etc.), associated with the one or more domain networks 250, that are to be used to attempt the call. In some implementations, the information may indicate a priority and/or an order associated with the one or more domain networks 250 and/or the one or more domain types (e.g., where the call may be attempted first using a first domain type with a first priority, attempted second using a second domain type with a second priority, etc.).

As shown in FIG. 4, process 400 may include determining a domain network associated with the call attempt (block 420). For example, selection device 230 may determine a domain network 250 associated with the call attempt for a call between calling device 210 and called device 260. In some implementations, selection device 230 may determine domain network 250 when selection device 230 receives, from calling device 210, information indicating that a call attempt (e.g., associated with a call between calling device 210 and called device 260) is to be made. Additionally, or alternatively, selection device 230 may determine domain network 250 when selection device 230 receives, from another device (e.g., a device associated with network 220), information indicating that selection device 230 is to determine domain network 250.

In some implementations, selection device 230 may determine domain network 250 based on information stored by selection device 230. For example, selection device 230 may store information that identifies domain network 250 that is to be used to attempt the call. In some implementations, selection device 230 may determine domain network 250 based on information indicating a priority and/or an order associated with one or more domain networks 250. For example, selection device 230 may store information indicating that the call is to be attempted first using a first domain network 250, the call is to be attempted second using a second domain network 250 (e.g., where called device 260 cannot be reached using the first domain network 250), and so on. Additionally, or alternatively, selection device 230 may determine the domain network 250 based on information indicating a default domain network 250 that is to be used to attempt the call. For example, selection device 230 may store information indicating that the call is to be attempted using a default domain network 250 (e.g., where no domain network 250 is specified in the information associated with the call attempt).

In some implementations, selection device 230 may determine domain network 250 based on information received from calling device 210. For example, calling device 210 may send information that identifies domain network 250 (e.g., where the calling party has selected domain network 250 using calling device 210). Additionally, or alternatively, selection device 230 may determine domain network 250 based on information received from network 220. For example, selection device 230 may receive information indicating that the call is to be attempted, and may query a device, associated with network 220, to determine domain network 250 and/or a priority associated with one or more domain networks 250 that are to be used to attempt the call.

As further shown in FIG. 4, process 400 may include providing an indication of a domain type, associated with the domain network, to be used for the call attempt (block 430).

For example, selection device 230 may provide an indication of a domain type, associated with domain network 250, to be used for the call attempt. In some implementations, selection device 230 may provide the indication when selection device 230 determines domain network 250 associated with the call attempt. Additionally, or alternatively, selection device 230 may provide the indication when selection device 230 receives, from a device associated with network 220, information indicating that the call attempt is to be made.

In some implementations, selection device 230 may provide the indication of the domain type to tone device 240. Additionally, or alternatively, selection device 230 may provide the indication to another device (e.g., included in network 220), associated with the call attempt, and the other device may forward the indication to tone device 240.

In some implementations, the indication of the domain type may include information that identifies the domain type to be used to attempt the call. For example, the indication may include information identifying the domain type (e.g., IMS, CDMA, GSM, WiFi, etc.) of domain network 250 to be used to for the call attempt. Additionally, or alternatively, the indication of the domain type may include information that identifies calling device 210 and/or called device 260 (e.g., a string of characters, an IMSI, an MSISDN, an MDN, etc.) associated with the call attempt.

As further shown in FIG. 4, process 400 may include determining whether a called device, associated with the call attempt, may be reached using the domain network (block 440). For example, selection device 230 may determine whether called device 260 may be reached using domain network 250. In some implementations, selection device 230 may determine whether called device 260 may be reached when selection device 230 provides the indication of the domain type, associated with domain network 250, to tone device 240. Additionally, or alternatively, selection device 230 may determine whether called device 260 may be reached when selection device 230 determines domain network 250. Additionally, or alternatively, selection device 230 may determine whether called device 260 may be reach when selection device 230 receives, from a device associated with network 220, information indicating that the call is to be attempted.

In some implementations, selection device 230 may determine whether called device 260 may be reached based on information received from another device associated with network 220. For example, selection device 230 may determine domain network 250, and may provide information, identifying domain network 250, to another device associated with network 220 (e.g., a device associated with attempting to reach called device 220). The other device may attempt to reach called device 260 (e.g., using domain network 250), and may provide, to selection device 230, information indicating whether called device 260 may be reached using domain network 250. Additionally, or alternatively, selection device 230 may determine whether called device 260 may be reached, using domain network 250, based on information received from domain network 250. For example, selection device 230 may attempt to reach called device 260 via a device associated with domain network 250, and may determine whether called device 260 may be reached based on information received from the device associated with domain network 250.

As further shown in FIG. 4, if the called device is reachable via the domain network (block 440-YES), then process 400 may include ending the domain selection process (block 450). For example selection device 230 may determine, based on information received from a device associated with network 220 and/or domain network 250, that called device 260 may be reached using domain network 250, and selection device 230 may not select another domain network 250 to be used for the call attempt. In some implementations, the call, between calling device 210 and called device 230, may be connected using domain network 250 (e.g., where called device 260 is reachable using domain network 250).

As further shown in FIG. 4, if the called device is not reachable using the domain network (block 440-NO), then process 400 may return to block 420. For example, selection device 230 may determine that called device 260 may not be reached using domain network 250, and selection device 230 may determine another domain network 250 to be used for the call attempt, as discussed above.

In this manner, selection device 230 may determine whether called device 260 may be reached using one or more domain networks 250, and selection device 230 may provide information indicating a domain type, associated with each of the one or more domain networks 250, when the call attempt is made using each of the one or more domain networks 250.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

Figure 5:
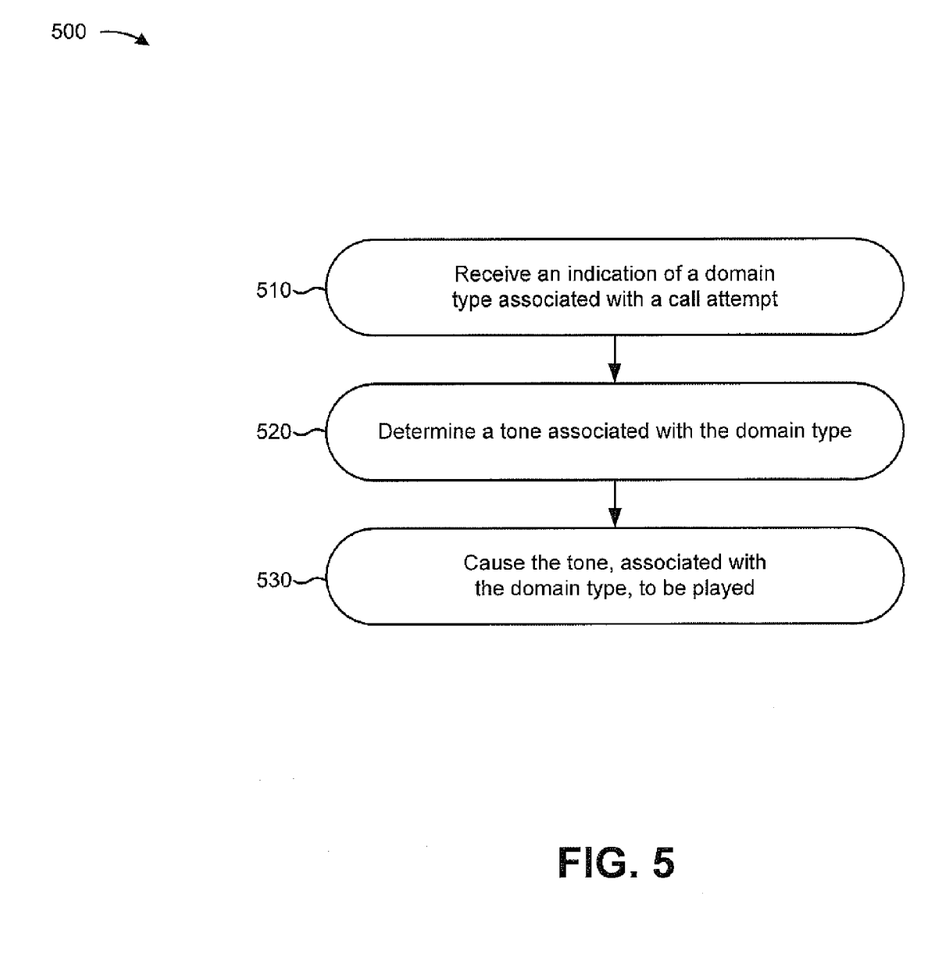
FIG. 5 is a flow chart of an example process for causing a tone, associated with a domain type, to be played by a calling device.

FIG. 5 is a flow chart of an example process 500 for causing a tone, associated with a domain type, to be played by a calling device. In some implementations, one or more process blocks of FIG. 5 may be performed by tone device 240. In some implementations, one or more process blocks of FIG. 5 may be performed by another device or a group of devices separate from or including tone device 240, such as selection device 230.

As shown in FIG. 5, process 500 may include receiving an indication of a domain type associated with a call attempt (block 510). For example, tone device 240 may receive an indication of a domain type associated with a call attempt, associated with calling device 210 and called device 260, using domain network 250. In some implementations, tone device 240 may receive the indication when selection device 230 determines domain network 250 associated with the call attempt.

In some implementations, tone device 240 may receive the indication of the domain type from selection device 230. Additionally, or alternatively, tone device 240 may receive the indication from another device, included in network 220, associated with the call attempt.

In some implementations, the indication of the domain type may include information that identifies the domain type to be used to attempt the call. For example, the indication may include information identifying the domain type (e.g., IMS, CDMA, GSM, etc.) of domain network 250 to be used to attempt the call. Additionally, or alternatively, the indication of the domain type may include information that identifies calling device 210 and/or called device 260 (e.g., a string of characters, an IMSI, an MSISDN, an MDN, etc.) associated with the call attempt.

As further shown in FIG. 5, process 500 may include determining a tone associated with the domain type (block 520). For example, tone device 240 may determine a tone associated with the domain type identified in the indication received from selection device 230. In some implementations, tone device 240 may determine the tone when tone device 240 receives, from selection device 230 and/or a device associated with network 220, the indication of the domain type associated with the call attempt. Additionally, or alternatively, tone device 240 may determine the tone when tone device 240 receives, from a device associated with network 220 and/or domain network 250, information indicating that the call is to be attempted using domain network 250.

The tone associated with the domain type may include a tone (e.g., a ringback tone, a ringback song, a ringback advertisement, etc.) that is to be played by and/or to calling device 210 when the call is attempted using domain network 250 associated with the domain type. For example, the tone may include a ringback tone, associated with a particular domain type (e.g., IMS, CDMA, GSM, etc.) and/or a particular domain network 250 (e.g., a particular IMS network, a particular CDMA network, a particular GSM network, etc.).

In some implementations, tone device 240 may determine the tone based on information stored by tone device 240. For example, tone device 240 may store information identifying a first tone, associated with a first domain type, may store information identifying a second tone, associated with a second domain type, etc., and tone device 240 may determine the tone based on the stored information. Additionally, or alternatively, tone device 240 may determine the tone based on information received from network 220 and/or domain network 250. For example, tone device 240 may receive information identifying a particular tone, associated with a particular domain type, from a device associated with network 220 and/or domain network 250, and tone device 240 may determine the tone based on the information received from the device associated with network 220 and/or domain network 250.

In some implementations, tone device 240 may determine the tone based on information provided by calling device 210. For example, a calling party, associated with calling device 210, may input (e.g., via calling device 210) information identifying a particular tone that is to be associated with a particular domain network 250 and/or a particular domain type, calling device 210 may provide the information to tone device 240, and tone device 240 may determine the tone based on receiving the information provided by calling device 210.

As further shown in FIG. 5, process 500 may include causing the tone, associated with the domain type, to be played (block 530). For example, tone device 240 may cause the tone, associated with the domain type, to be played by and/or to calling device 210. In some implementations, tone device 240 may cause the tone to be played when tone device 240 determines the tone associated with the domain type. Additionally, or alternatively, tone device 240 may cause the tone to be played when tone device 240 receives, from a device associated with network 220 and/or a device associated with domain network 250, information indicating that the tone is to be played (e.g., when the call attempt is made). Additionally, or alternatively, tone device 240 may cause the tone to be played when tone device 240 receives information, from selection device 230, indicating that that the tone is to be played.

In some implementations, tone device 240 may cause the tone to be played by providing information, associated with the tone, to calling device 210. For example, tone device 240 may store information associated with playing the tone, may provide the information to calling device 210, and calling device 210 may play the tone based on receiving the information, associated with playing the tone, from tone device 240. Additionally, or alternatively, tone device 240 may cause the tone to be played by calling device 210 by providing information to a device associated with network 220. For example, tone device 240 may provide, to the device associated with network 220, information associated with playing the tone, the device may forward the information to calling device 210, and calling device 210 may play the tone based on receiving the information, associated with playing the tone, from the device associated with network 220.

In this manner, tone device 240 may receive information indicating a domain type, associated with a call attempt for a call between calling device 210 and called device 260, and may cause a tone, associated with the domain type, to be played by and/or to calling device 210.

Although FIG. 5 shows example blocks of process 500, in some implementations, process 500 may include additional blocks, different blocks, fewer blocks, or differently arranged blocks than those depicted in FIG. 5. Additionally, or alternatively, one or more of the blocks of process 500 may be performed in parallel.

Figure 6A:
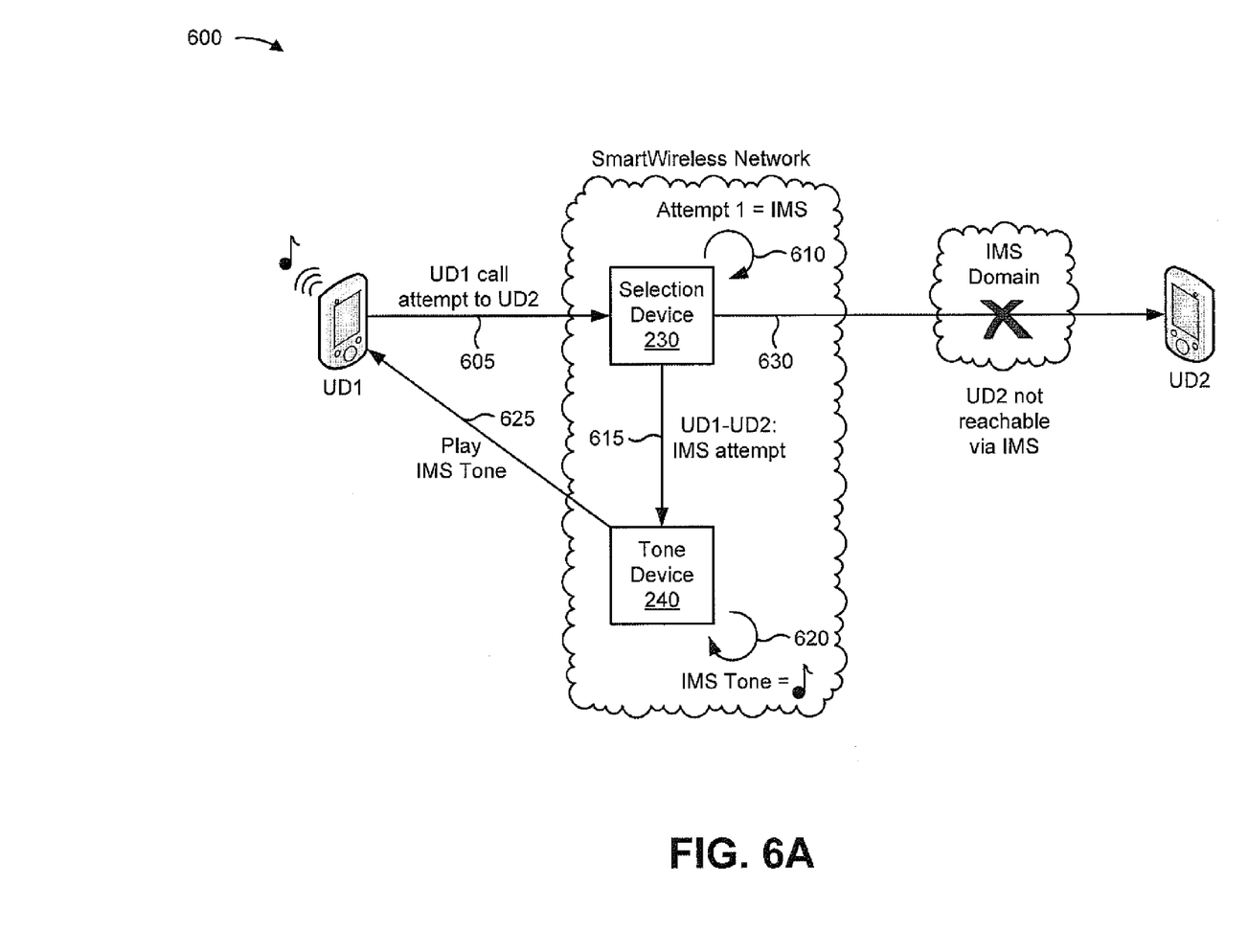
FIGS. 6A-6C are diagrams of an example implementation relating to the example processes shown in FIGS. 4 and 5.
Figure 6B:
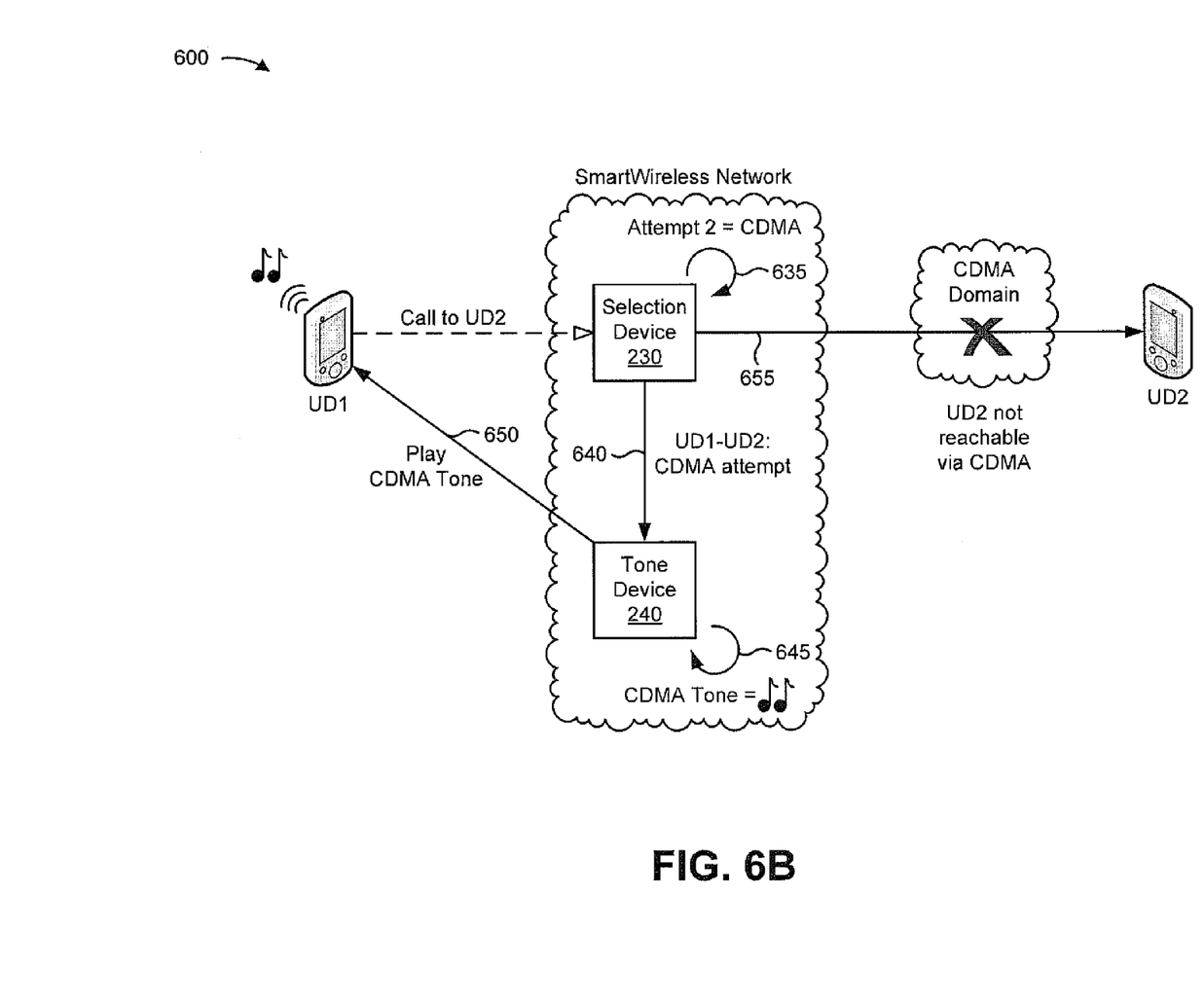
Figure 6C:
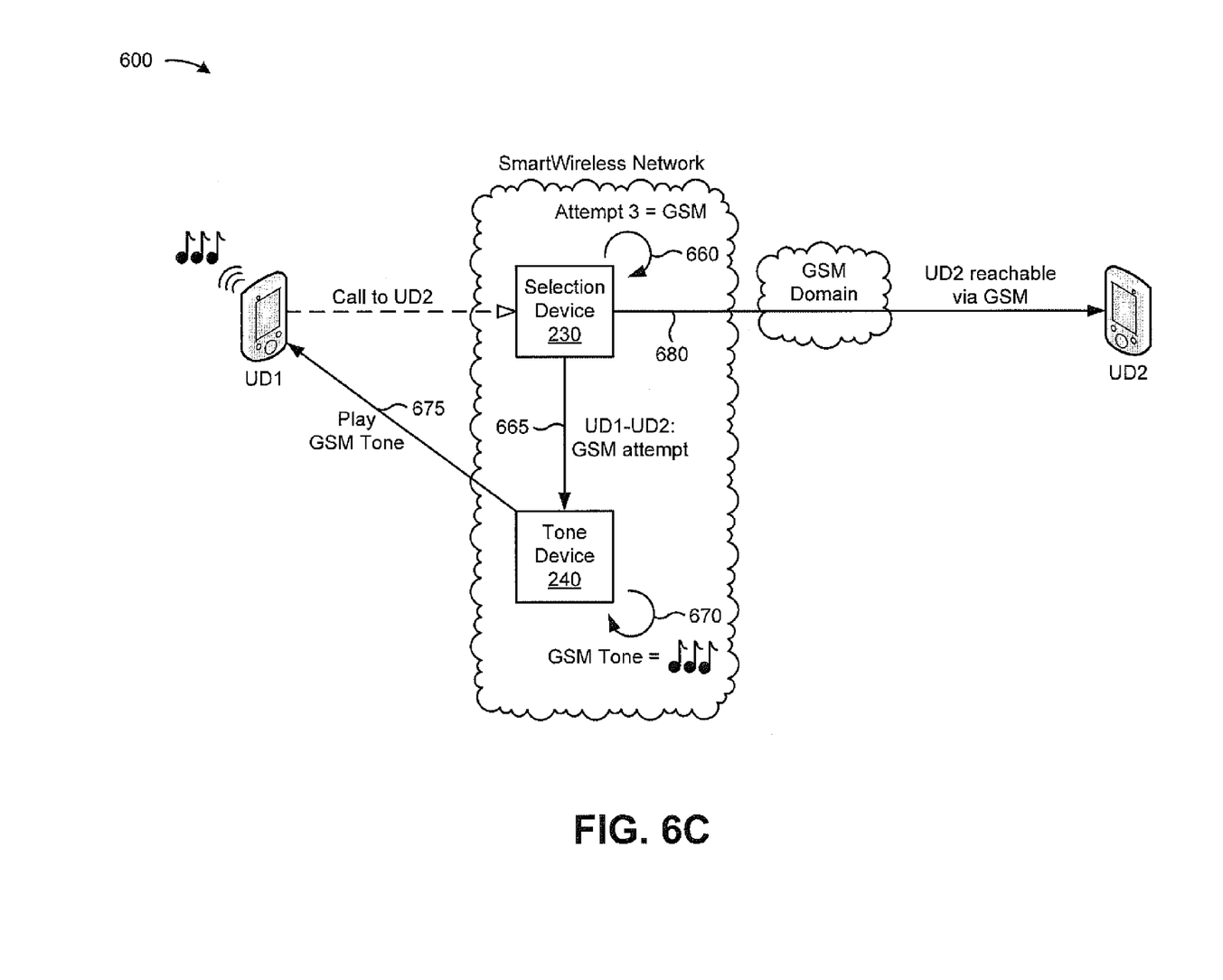

FIGS. 6A-6C are diagrams of an example implementation 600 relating to example processes 400 and 500 shown in FIGS. 4 and 5, respectively. For the purposes of example implementation 600, assume that a calling party, associated with a calling device, UD1, wishes to attempt a voice call to a called device, UD2. Further, assume that the call attempt is to be made via a SmartWireless service provider network. Finally, assume that the SmartWireless network allows for the call to be attempted using multiple domain networks (e.g., an IMS domain network, a CDMA domain network, and a GSM domain network) included in the SmartWireless service provider network.

As shown in FIG. 6A, and by reference number 605, UD1 may attempt to call UD2 via the SmartWireless network, and selection device 230 may receive information associated with the call attempt (e.g., information identifying UD1, information identifying UD2). As shown by reference number 610, selection device 230 may determine, based on information stored by selection device 230, that the call is (e.g., by default) to first be attempted using an IMS domain network associated with the SmartWireless network. As shown by reference number 615, selection device 230 may provide, to tone device 240, information indicating a first domain type (e.g., IMS), that is to be used for the call attempt associated with UD1 and UD2.

As shown by reference number 620, tone device 240 may receive the information indicating the IMS domain type, and may determine, based on information stored by tone device 240, a tone associated with the IMS domain type. As shown by reference number 625, tone device 240 may provide, to UD1, information that causes the IMS tone to be played by UD1, and UD1 may play the IMS tone.

As further shown in FIG. 6A, and by reference number 630, selection device 230 may attempt to reach UD2 using the IMS domain network, and may determine that UD2 is not reachable via the IMS domain network.

As shown in FIG. 6B, and by reference number 635, selection device 230 may determine, based on information stored by selection device 230, that the call is to be attempted second using a CDMA domain network associated with the SmartWireless network (e.g., since UD2 was not reachable via the IMS domain network). As shown by reference number 640, selection device 230 may provide, to tone device 240, information indicating a second domain type (e.g., CDMA), that is to be used for the call attempt associated with UD1 and UD2.

As shown by reference number 645, tone device 240 may receive the information indicating the CDMA domain type, and may determine, based on information stored by tone device 240, a tone associated with the CDMA domain type. As shown by reference number 650, tone device 240 may provide, to UD1, information that causes the CDMA tone to be played by UD1, and UD1 may play the CDMA tone.

As further shown in FIG. 6B, and by reference number 655, selection device 230 may attempt to reach UD2 using the CDMA domain network, and may determine that UD2 is not reachable via the CDMA domain network.

As shown in FIG. 6C, and by reference number 660, selection device 230 may determine, based on information stored by selection device 230, that the call is to be attempted third using a GSM domain network associated with the SmartWireless network (e.g., since UD2 was not reachable via the IMS domain network or the CDMA domain network). As shown by reference number 665, selection device 230 may provide, to tone device 240, information indicating a third domain type (e.g., GSM), that is to be used for the call attempt associated with UD1 and UD2.

As shown by reference number 670, tone device 240 may receive the information indicating the GSM domain type, and may determine, based on information stored by tone device 240, a tone associated with the GSM domain type. As shown by reference number 675, tone device 240 may provide, to UD1, information that causes the GSM tone to be played by UD1, and UD1 may play the GSM tone.

As further shown in FIG. 6C, and by reference number 680, selection device 230 may attempt to reach UD2 using the GSM domain network, and may determine that UD2 is reachable via the GSM domain network. Selection device 230 may stop the domain selection process, and the call between UD1 and UD2 may be connected (e.g., by selection device 230, another device included in the SmartWireless network, and/or a device included in the GSM domain network).

As indicated above, FIGS. 6A-6C are provided merely as an example. Other examples are possible and may differ from what was described with regard to FIGS. 6A-6C.

Figure 7:
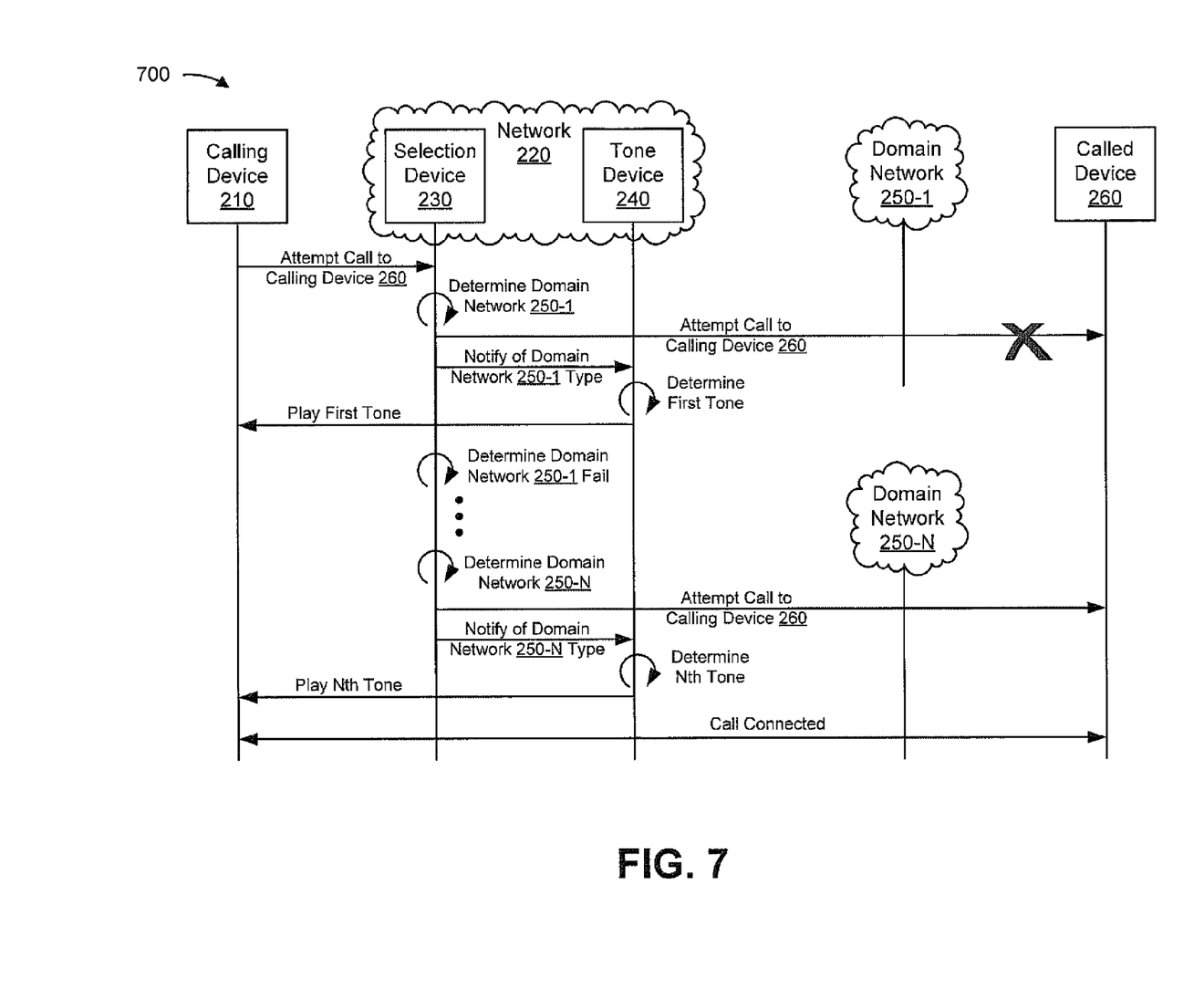
FIG. 7 is a diagram of an example of a call flow for attempting a call via two or more domain networks, and providing an indication of a domain type associated with each domain network.

FIG. 7 is a diagram of an example of a call flow 700 for attempting a call via two or more domain networks and providing an indication of a domain type associated with each domain network.

As shown in FIG. 7, calling device 210 may wish to attempt to call called device 260 (e.g., via network 220). As shown, selection device 230 may receive information associated with the call attempt, and may determine that the call may be attempted via domain network 250-1. As further shown, selection device 230 may cause the call to be attempted via domain network 250-1, and may provide, to tone device 240, an indication that the call is being attempted via a first domain type (e.g., a domain type associated domain network 250-1).

As further shown, tone device 240 may receive the indication, and may determine a first tone associated the first domain type. As shown, tone device 240 may cause the first tone to be played by calling device 210 (e.g., while the call is being attempted via domain network 250-1). As further shown, selection device 230 may determine that the call cannot be connected via domain network 250-1. Selection device 230 may select other domain networks (e.g., domain network 250-2, etc.) and a tone, associated with each domain network 250, may be played in the manner described above.

As further shown, selection device 230 may determine that the call may be attempted via domain network 250-N (N>1). As further shown, selection device 230 may cause the call to be attempted via domain network 250-N, and may provide, to tone device 240, an indication that the call is being attempted via an Nth domain type (e.g., a domain type associated domain network 250-N).

As further shown, tone device 240 may receive the indication, and may determine an Nth tone associated the Nth domain type. As shown, tone device 240 may cause the Nth tone to be played by calling device 210 (e.g., while the call is being attempted via domain network 250-N). As further shown, selection device 230 may determine that the call can be connected via domain network 250-N, and calling device 210 and called device 260 may be connected, accordingly.

As indicated above, FIG. 7 is provided merely as an example. Other examples are possible and may differ from what was described with regard to FIG. 7.

Implementations described herein may allow a tone, associated with a domain network, to be played by and/or to a calling device when a call is attempted using the domain network. In this way, a calling party, associated with the calling device, may be notified when the call is attempted via the domain network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A device, comprising:
one or more processors to:
receive information associated with a call attempt,
the call attempt being associated with a calling device and a called device;
determine a first domain network associated with the call attempt, the first domain network being associated with a first domain type;
identify the first domain type associated with the first domain network;
select a first ringback tone, associated with the first domain type, that is to be played by and/or to the calling device,
the first ringback tone being selected from among a plurality of ringback tones that may be played by and/or to the calling device while a call to the called device is attempted,
each of the plurality of ringback tones being associated with a different domain type;
cause the first ringback tone, associated with the first domain type, to be played by and/or to the calling device while the call to the called device is attempted via the first domain network;
determine that the called device cannot be reached using the first domain network;
determine a second domain network associated with a second domain type that is to be used to attempt the call;
select a second ringback tone, from among the plurality of ringback tones, that is associated with the second domain type; and
cause a tone, being played by and/or to the calling device while the call to the called device is attempted, to change from the first ringback tone to the second ringback tone based on switching from the first domain network to the second domain network to attempt the call.

2. The device of claim 1, where the one or more processors are further to:
receive information identifying the called device; and
where the one or more processors, when determining the first domain network associated with the call attempt, are to:
determine the first domain network based on the information identifying the called device.

3. The device of claim 1, where the one or more processors are further to:
receive information identifying a priority associated with one or more domain networks; and
where the one or more processors, when determining the first domain network associated with the call attempt, are to:
determine the first domain network based on the priority associated with the one or more domain networks.

4. The device of claim 1, where the one or more processors are further to:
receive, from the calling device, information identifying the first domain network associated with the call attempt; and
where the one or more processors, when determining the first domain network associated with the call attempt, are to:
determine the first domain network based on the information, received from the calling device, identifying the first domain network.

5. The device of claim 1, where the one or more processors are further to:
receive information that identifies the first ringback tone, associated with the first domain type, from the calling device;
store the information that identifies the first ringback tone; and
where the one or more processors, when selecting the first ringback tone to be played by and/or to the calling device, are to:
determine the first ringback tone based on the stored information that identifies the first ringback tone.

6. The device of claim 1, where the one or more processors, when causing the first ringback tone to be played by and/or to the calling device, are to:
provide information identifying the first ringback tone; and
send an indication that the first ringback tone is to be played by and/or to the calling device.

7. The device of claim 1, where the plurality of ringback tones are associated with a plurality of domain types including at least two of:
an internet protocol multimedia subsystem (IMS) domain type,
a code division multiple access (CDMA) domain type,
a global system for mobile communications (GSM) domain type, or
a WiFi domain type.

8. A non-transitory computer-readable medium storing instructions, the instructions comprising:
one or more instructions that, when executed by one or more processors, cause the one or more processors to:
receive information identifying a call attempt associated with a calling device;
select a first domain network, of a plurality of domain networks, for the call attempt,
each of the plurality of domain networks being associated with a respective domain type;
identify a first domain type associated with the first domain network;
select a first ringback tone, associated with the first domain type, that is to be played by and/or to the calling device,
the first ringback tone being selected from among a plurality of ringback tones that may be played by and/or to the calling device while a call to the called device is attempted,
each of the plurality of ringback tones being associated with a respective domain type;
cause the first ringback tone, associated with the first domain type, to be output by the calling device to notify a user of the calling device that the call attempt is being made via the first domain network;
determine that the called device cannot be reached using the first domain network;
select a second domain network of the plurality of domain networks,
the second domain network being associated with a second domain type; and
cause a tone, being played by and/or to the calling device while the call to the called device is attempted, to change from the first ringback tone to a second ringback tone, associated with the second domain type, based on switching from the first domain network to the second domain network to attempt the call.

9. The non-transitory computer-readable medium of claim 8, where the one or more instructions, when executed by the one or more processors, further cause the one more processors to:
receive information identifying the calling device; and
where the one or more instructions, that cause the one or more processors to select the first domain network for the call attempt, cause the one or more processors to:
select the first domain network based on the information identifying the calling device.

10. The non-transitory computer-readable medium of claim 8, where the one or more instructions, when executed by the one or more processors, further cause the one more processors to:
receive information identifying an order associated with plurality of domain networks; and
where the one or more instructions, that cause the one or more processors to select the first domain network for the call attempt, cause the one or more processors to:
select the first domain network based on the order associated with the plurality of domain networks.

11. The non-transitory computer-readable medium of claim 8, where the one or more instructions, when executed by the one or more processors, further cause the one more processors to:
receive, from the calling device, information identifying the first domain network for the call attempt; and
where the one or more instructions, that cause the one or more processors to select the first domain network for the call attempt, cause the one or more processors to:
select the first domain network based on the information identifying the first domain network received from the calling device.

12. The non-transitory computer-readable medium of claim 8, where the one or more instructions, when executed by the one or more processors, further cause the one more processors to:
provide information that identifies the first domain type; and
where the one or more instructions, that cause the one or more processors to cause the first ringback tone to be output by the calling device, cause the one or more processors to:
cause the first ringback tone to be output based on providing the information that identifies the first domain type.

13. The non-transitory computer-readable medium of claim 8, where the one or more instructions, when executed by the one or more processors, further cause the one more processors to:
provide information that identifies the first ringback tone; and
send an indication that the first ringback tone is to be output by the calling device; and
where the one or more instructions, that cause the one or more processors to cause the first ringback tone to be output by the calling device, cause the one or more processors to:
cause the first ringback tone to be output based on sending the indication.

14. The non-transitory computer-readable medium of claim 8, where the plurality of ringback tones are associated with a plurality of domain types including at least two of:
an internet protocol multimedia subsystem (IMS) domain type,
a code division multiple access (CDMA) domain type,
a global system for mobile communications (GSM) domain type, or
a WiFi domain type.

15. A method, comprising:
receiving, by one or more devices, information identifying a call attempt associated with a calling device and a called device;
selecting, by the one or more devices, a first domain network, of a plurality of domain networks, for the call attempt,
each of the plurality of domain networks being associated with a respective domain type;
identifying, by the one or more devices, a first domain type associated with the first domain network;
determining, by the one or more devices, a first ringback tone that is to be played by and/or to the calling device,
the first ringback tone being determined based on the first domain type associated with the first domain network,
the first ringback tone being determined from a plurality of ringback tones, that may be played by and/or to the calling device while a call to the called device is attempted, that are each associated with a respective domain type;
causing, by the one or more devices, the first ringback tone to be played by and/or to the calling device while the called device is being contacted during the call attempt;
determining, by the one or more devices, that the called device cannot be reached using the first domain network;
selecting, by the one or more devices, a second domain network, of the plurality of domain networks,
the second domain network being associated with a second domain type;
determining, by the one or more devices, a second ringback tone associated with the second domain type; and
causing, by the one or more devices, a tone, being played by and/or to the calling device while the call to the called device is attempted, to change from the first ringback tone to the second ringback tone based on switching from the first domain network to the second domain network to attempt the call.

16. The method of claim 15, further comprising:
receiving information identifying the called device; and
where selecting the first domain network for the call attempt comprises:
selecting the first domain network based on the information identifying the called device.

17. The method of claim 15, further comprising:
receiving information identifying a priority associated with the plurality of domain networks; and
where selecting the first domain network to be used for the call attempt comprises:
selecting the first domain network based on the priority associated with the plurality of domain networks.

18. The method of claim 15, further comprising:
receiving information that identifies the first ringback tone from the calling device;
storing the information that identifies the first ringback tone; and
where determining the first ringback tone that is to be played by and/or to the calling device comprises:
determining the first ringback tone based on the stored information that identifies the first ringback tone.

19. The method of claim 15, where the plurality of ringback tones are associated with a plurality of domain types including at least two of:
an internet protocol multimedia subsystem (IMS) domain type,
a code division multiple access (CDMA) domain type,
a global system for mobile communications (GSM) domain type, or
a WiFi domain type.

* * * * *